United States Patent [19]

Schorman et al.

[11] Patent Number: 5,157,728
[45] Date of Patent: Oct. 20, 1992

[54] AUTOMATIC LENGTH-REDUCING AUDIO DELAY LINE

[75] Inventors: Eric R. Schorman, Bedford; John D. Reed, Arlington, both of Tex.

[73] Assignee: Motorola, Inc., Schaumburg, Ill.

[21] Appl. No.: 592,001

[22] Filed: Oct. 1, 1990

[51] Int. Cl.⁵ .............................................. G10L 5/00
[52] U.S. Cl. .......................................... 381/33; 381/46
[58] Field of Search .................................... 381/31-33, 381/46

[56] References Cited

U.S. PATENT DOCUMENTS 4,110,560  8/1978  Leary et al. ........................... 381/31
4,959,865  9/1990  Stettiner ................................ 381/46

OTHER PUBLICATIONS

F. F. Lee, "Time Compression and Expansion of Speech by the Sampling Method", *Journal of the Audio Engineering Society*, Nov. 1972, vol. 20, No. 9.
E. Schorman, "Digital Voice Storage for Mobile Radios", *Mobile Radio Technology*, May 1983.

*Primary Examiner*—Emanuel S. Kemeny
*Attorney, Agent, or Firm*—Michael J. Buchenhorner; Juliana Agon

[57] ABSTRACT

An electronic system and a method substantially eliminates any delays caused by buffering of a signal containing speech. The electronic system comprises a receiver for receiving signals, a buffer, coupled to the receiver, a buffer controller coupled to the buffer, and an audio section for presenting signals received to a listener. The method comprises the following steps. The receiver receives an input signal representing speech, and produces an output signal representing the input signal after a delay intentionally introduced in the system. The delay corresponds to the length of the buffer. The buffer stores the input signal in the buffer at an input rate, and produces the output signal at an output rate. The buffer controller determines whether the delay or buffer length is greater than a predetermined threshold, and analyzes at least a portion of the input signal stored in the buffer to determine which parts of the input signal may be removed without substantial deterioration of the signal quality according to at least one predetermined criterion, when the buffer length is greater than a predetermined length. The buffer controller then deletes at least some of the parts of the input signal stored in the buffer that comply with the predetermined criterion.

25 Claims, 5 Drawing Sheets

AUTOMATIC LENGTH-REDUCING AUDIO DELAY LINE

TECHNICAL FIELD

This invention relates generally to communication systems and devices, and more specifically to communication systems using signal buffering and digital signal processing.

BACKGROUND

Several electronic systems may use voice buffers as optional or essential system components to allow time for signal processing, for time-shifting to a more convenient time for transmission or reception, or for performing time-domain processing or sequencing of voice. In each of those systems, the delay caused by voice buffering is both an advantage and a disadvantage. Typically, the delay is an advantage at the beginning of a transmission(e.g., to obtain a communication channel), but a disadvantage at the end of a transmission because of the increased turn-around time between the parties communicating. Thus, a need exists for a method for automatically reducing the intentional delay toward zero (i.e., substantially eliminating the delay).

SUMMARY OF THE INVENTION

Briefly, according to the invention, an electronic system and a method substantially eliminates any delays caused by buffering of a signal containing speech. The electronic system comprises a buffer for storing signals representing speech, and a controller coupled to the buffer for controlling the buffer. The electronic system substantially eliminates any delays in the output of the buffer utilizing a method in accordance with the invention. The method comprises the following steps. The buffer receives the input signal representing speech, and produces an output signal representing the input signal, possibly after a delay. The buffer stores the input signal in the buffer at an input rate, and produces an output signal representing the input signal, at an output rate. The buffer controller determines whether the current buffer length is greater than some predetermined minimum threshold, and analyzes at least a portion of the input signal stored in the buffer to determine which parts of the input signal may be removed from the stored signal. A predetermined criterion or set of criteria may be used to determine which parts of the stored signal may be removed without substantial distortion of the stored signal. According to a possible criterion, the buffer controller determines which parts of the stored signal have a magnitude lesser than a predetermined energy level, when the buffer controller determines that the current buffer length is greater than some predetermined minimum threshold, and those parts are then deleted. According to another aspect of the invention, the criterion for removing parts of the stored signal is whether those parts of the stored signal are repetitive (i.e., representing pitch periods of the stored speech).

DETAILED DESCRIPTION OF THE PREFERRED EMBODIMENT

Figure 1:
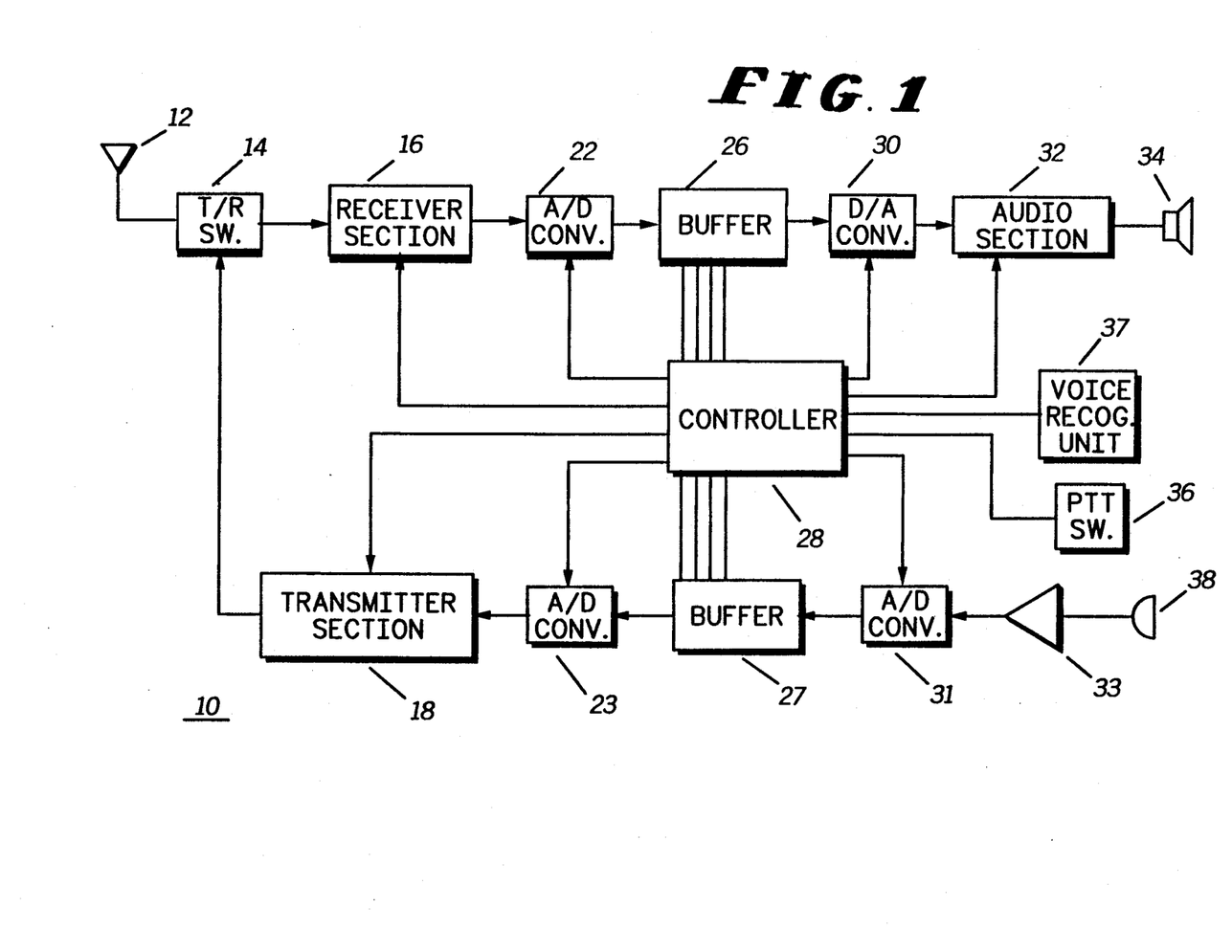
FIG. 1 is a simplified block diagram showing an audio-producing system in accordance with the invention.

Referring to FIG. 1, a simplified block diagram is shown, depicting a communication device 10 incorporating the invention. An antenna 12 receives radio signals containing speech information. When a transmit/receive switch 14 is in the receive position, the radio signals are provided to a conventional receiver section 16 which, in turn, produces an input signal representing speech information that is provided to an analog-to-digital converter 22, for producing a digital signal at an input rate set by a controller 28 (e.g., a microprocessor, a digital signal processor, or custom hardware specifically designed to perform the functions of the invention). The digital signal is then sampled and stored in a conventional circular buffer 26 that comprises a memory (e.g., a large DRAM). The controller 28 causes the buffer 26 to sample and store the input signal (at an input rate), and provides an input rate clock signal to the analog-to-digital converter 22, and an output rate clock signal to the digital-to-analog converter 30. The A/D converter 22 includes the proper anti-aliasing filter and the D/A converter 30 includes the proper reconstruction filter as is well known in the art. The clock signals set the input and output rates (respectively) of the buffer 26. Moreover, the controller 28 controls the memory address to cause successive samples to be stored in an increasing address of memory, and additionally controls a similar process to read samples from the buffer 26 to produce a digital audio signal, and convert it to a restored analog signal, with good fidelity, with the digital-to-analog converter 30, for presentation to a listener by a speaker 34 after processing by a conventional audio section 32. The rate at which the digital audio signals are read from the buffer 26 and converted to analog form, with the digital-to-analog converter 30, is controlled by the controller 28. In addition, the controller 28 can offset the read address from the write address of the audio stored in the buffer 26, to produce a delay that is well known.

The radio 10 also includes a transmitter section which transmits information received at an input 38 (e.g., a microphone), when the switch 14 is in the transmit position. An amplifier 33 is coupled to the microphone 38 to provide an amplified signal to an analog-to-digital converter 31 which converts the received signal to digital form. The digital signal provided by the A/D converter 31 is stored in a buffer 27 at an input rate controlled by the controller 28. Similarly to the case of the receiver, the buffer output is converted to analog for by a D/A converter 23. The A/D converter 31 includes the proper anti-aliasing filter and the D/A converter 23 includes the proper reconstruction filter. The resulting analog signal is transmitted by a conventional transmitter 18 when the T/R switch 14 is in the transmit position. The transmission mode of the radio 10 is triggered by activating a push-to-talk switch 36, or in response to input from voice recognition unit 37.

A voice buffer (such as buffers 26 and 27) may be implemented with a moving magnetic tape and fixed heads, fixed tape and moving heads, a combination of these, or a random access memory (RAM) with a read address and a write address. The reading and writing processes in the buffer can be controlled by read and write controllers, which could be advanced at the same rate, at different rates or either one or both can be stopped. The read and write controllers could be a part of the controller 28. The distance between the write and read positions, expressed in time, represents the delay in the presentation (i.e., reading) of the stored voice by the buffer from the time that the voice was stored (i.e., written) in the buffer. For example, a tape moving at a rate of 10 in./sec., with heads one inch apart will have a delay of 100 msec. the delay may also be called the "current buffer length." The maximum buffer length of the buffer RAM is the total number of samples it can hold divided by the sample rate (e.g., 1.0 Megabyte/10,000 samples/sec. × 1 sample/byte = 100 sec.). If there is complete control over the present positions of the read and write pointers and over the rate at which they advance, a variable-length buffer can be realized.

According to an embodiment of the invention, when the PTT switch 36 is pressed, the controller 28 generates a data packet to be sent at the beginning of the transmission. This packet is called the PTT ID, and may last about 600 msec. During this time, the audio signal at the microphone 38 is recorded by the buffer 27. After the PTT ID has been sent, the audio signal stored in the buffer 27 is played back, now delayed by the hold off time (e.g., about 600 msec.). Thus, no audio has been lost at the beginning of the transmission. According to the invention, the controller 28 analyzes the buffer 27, and causes the delay to be reduced by deleting at least some portions of the stored signal that comply with a set of predetermined criteria. The predetermined criteria include (1) whether the parts to be removed correspond to pauses in the speech represented by the stored audio signal (i.e., parts of the stored signal having low signal energy), or (2) whether the parts to be removed correspond to repetitive segments of the stored signal (i.e., pitch periods). Complete reduction of the delay may be desirable but is not necessary. For example, if the described 600 millisecond delay of a 15 second transmission can be reduced to 100 milliseconds, the turn around would be greatly improved.

Thus, it is unnecessary to remove all of the parts of the stored information signal complying with the predetermined criterion (or criteria). In the case that the portions of the stored speech to be removed represent silence gaps in the speech, the duration of those gaps may be shortened by some predetermined percentage, thereby reducing the delay in the buffer with little loss of audio quality. In cases of pitch period removal, the pitch information of the stored voice signal can also be determined by processing the buffer data. Based on this information, the removal of a selected pitch period could be made. Additionally, a combination of pitch period removal and voice gap removal may be performed to improve performance of the buffer length reduction method.

According to another embodiment of the invention, a voice recognition unit 37 may be included in the radio 10 instead of the PTT switch 36. The voice recognition unit 37 is coupled to the controller 28 via an address and data bus. In this embodiment, the voice recognition unit 37 analyzes the speech samples received at the microphone 38. Since a certain amount of time is required to process the received speech, a voice buffer in which to store received signals is required. If the voice recognition unit 37 determines that the voice signal coming into the microphone is to be transmitted, the controller 28 is informed, causing the unit to begin transmitting. The transmit audio is played back at the proper starting point. This starting point will represent audio information already stored in the buffer. Thus, no audio is lost at the beginning of the transmission. The controller analyzes the buffer 27 and causes the delay to be reduced by using a speech-processing method. For example, one method would involve looking for silence gaps in the stored speech signal and reducing the the duration of those silence gaps by some percentage, thereby reducing the delay in the buffer with little effect on audio quality. The pitch information of the voice could also be determined by processing the buffer data. Based on this information, the removal of a carefully selected pitch period could be made, thus reducing the buffer length with minimal effect on the voice quality of the system. Since the removal of pitch information implies that there is a minimum buffer length, a combination of pitch removal and silence gap removal could be performed to improve the performance of the buffer reduction method.

Intentional delays in production of a voice buffer output are useful in both the receive and transmit paths of the radio 10. Thus the delay reduction processes of the invention are also useful in both paths. The only difference between those applications is in the source of the high-level decision as to whether the output process should occur.

Figure 2:
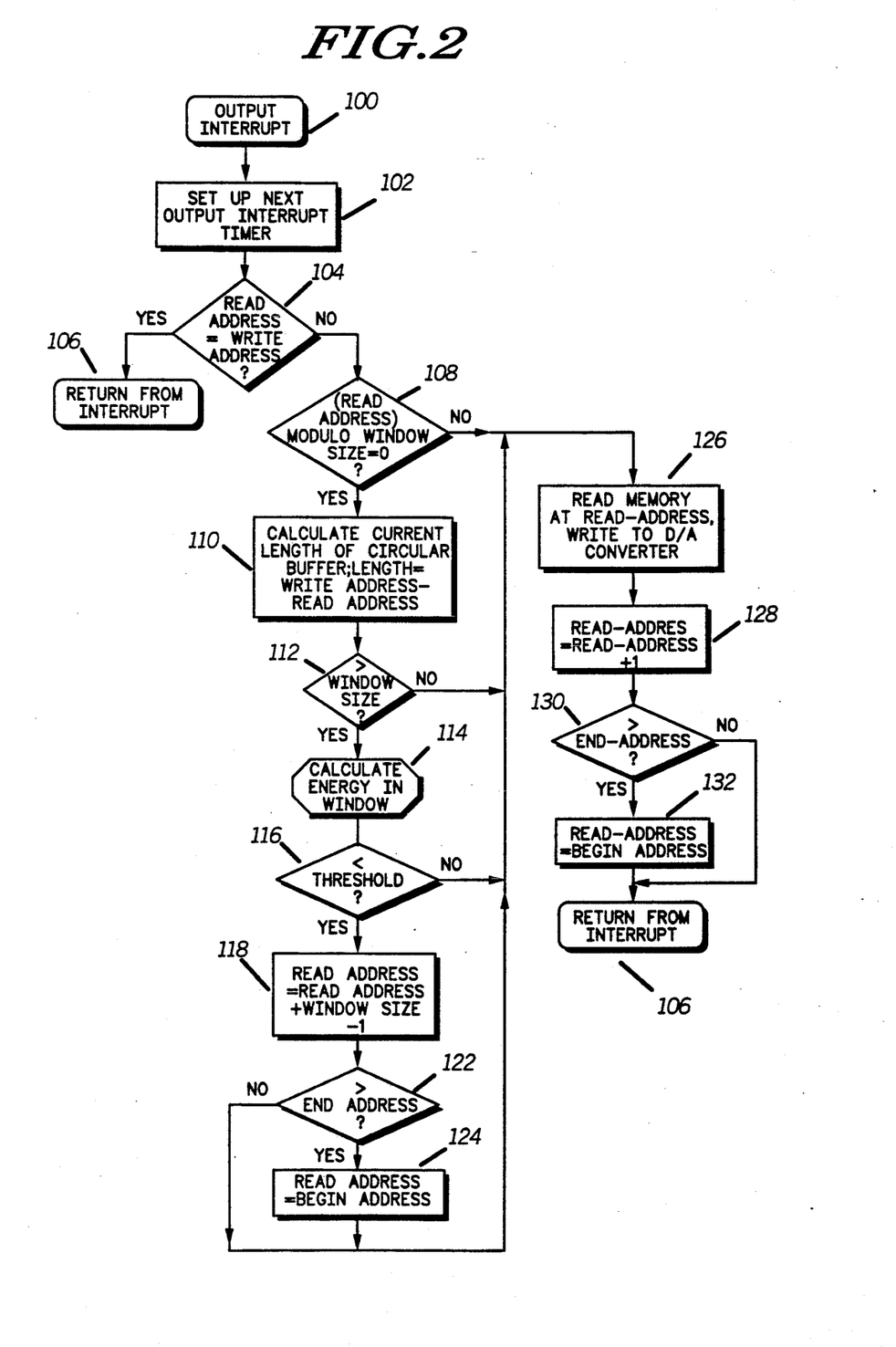
FIG. 2 is a flow chart illustrating an output process in one embodiment of the invention.

Referring to FIG. 2, there is shown a flow chart of the output process of one method for buffer output delay reduction in accordance with the invention. Step 100 is entered when it is time to produce an output sample. This may be implemented in a microprocessor or a digital signal processor by having a timer interrupt the normal instruction execution. In step 102, an interrupt timer is set up to produce an interrupt at the next output sample time. A decision 104 is then made to determine whether the read address of the buffer equals the write address of the buffer (i.e., whether the buffer is empty). If the read address of the buffer equals the write address of the buffer (i.e., the buffer is empty) the method proceeds to step 106 to return to the main instruction stream to wait for an input sample to be stored. If the read address of the buffer does not equal the write address of the buffer, a further decision 108 must be made as to whether the read address modulo window size equals zero (i.e., whether it is time to examine the buffer contents). If it is zero, the current length of the buffer is calculated in step 110, with the controller. If the read address modulo window size does not equal zero, the method proceeds to step 126.

After step 110, a decision 112 on whether the current length of the circular buffer is greater than the window size. If it is greater, the energy in the window is calculated (114). A decision 116 then determines whether the energy in the window is below a predetermined threshold that indicates that a pause in the speech represented by the stored signal may be occurring. A portion of such pauses may be eliminated from the stored signal without significant loss of quality. If the energy in the window is below the predetermined threshold, the window size minus one is added to the read address, in step 118. If the current length of the circular buffer is not greater than the window size, or the energy in the window is not greater than the predetermined threshold, the method proceeds to step 126.

After step 118, a decision 122 is made to determine whether the read address resulting from step 118 is less than the end address. If it is not less than the end address, the process proceeds to step 126. If the read address resulting from step 118 is less than the end address, the read address is set to be equal to the begin address, and the process then proceeds to step 126.

In step 126 the controller 28 reads the memory at the read address, and writes it to the D/A converter 23 (or 30). The read address is then incremented by one in step 128. A decision 130 is then made to determine whether the incremented read address is greater than the end address. If it is, the read address is reset to be the begin address, in step 132, and the operation in step 106 will cause the normal processing to continue, until it is time to produce a new output sample. In the event that decision 130 determines that the incremented read address is not greater than the end address, the buffer returns to normal operation in step 106.

Figure 3:
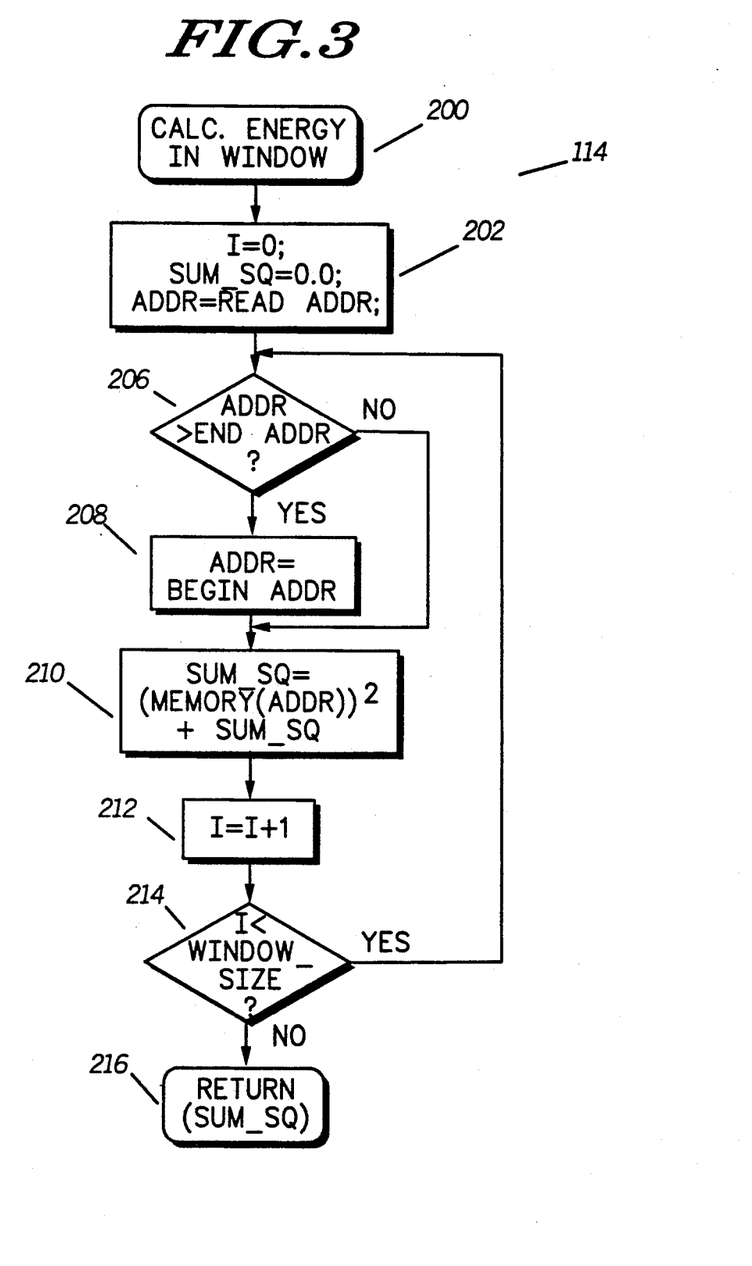
FIG. 3 is a flow chart illustrating a process for calculating the energy in a segment of the buffer.

Referring to FIG. 3, there is shown a flow chart illustrating a process 200 for calculating the energy in a segment of the buffer. In step 202 a sample counter parameter (i) is set at zero, a sum of squares parameter is set at 0.0, and an address parameter is set at the read address. A decision 206 is then made as to whether the current address is greater than the end address, to determine whether the segment of samples has wrapped around the physical end of memory. If the current address is not greater than the end address, the process proceeds to step 210. If it is greater than the end address, then the address parameter is set at the begin address, in step 208. The contents of the memory address are squared and added to the current value of the sum of squares parameter, in step 210. The contents of the memory at the current address are several voltage levels. Their squares approximate a measure of the energy contents. The sample parameter is then incremented by one in step 212. A decision 214 is then made to determine whether the sample counter equals the window size. The window size represents the part of the signal that may be deleted. If the sample counter is less than the window size, the process returns to step 206. If the sample counter is not less than the window size, the process continues (216), where the sum of squares will be returned to the calling routine.

Figure 4A:
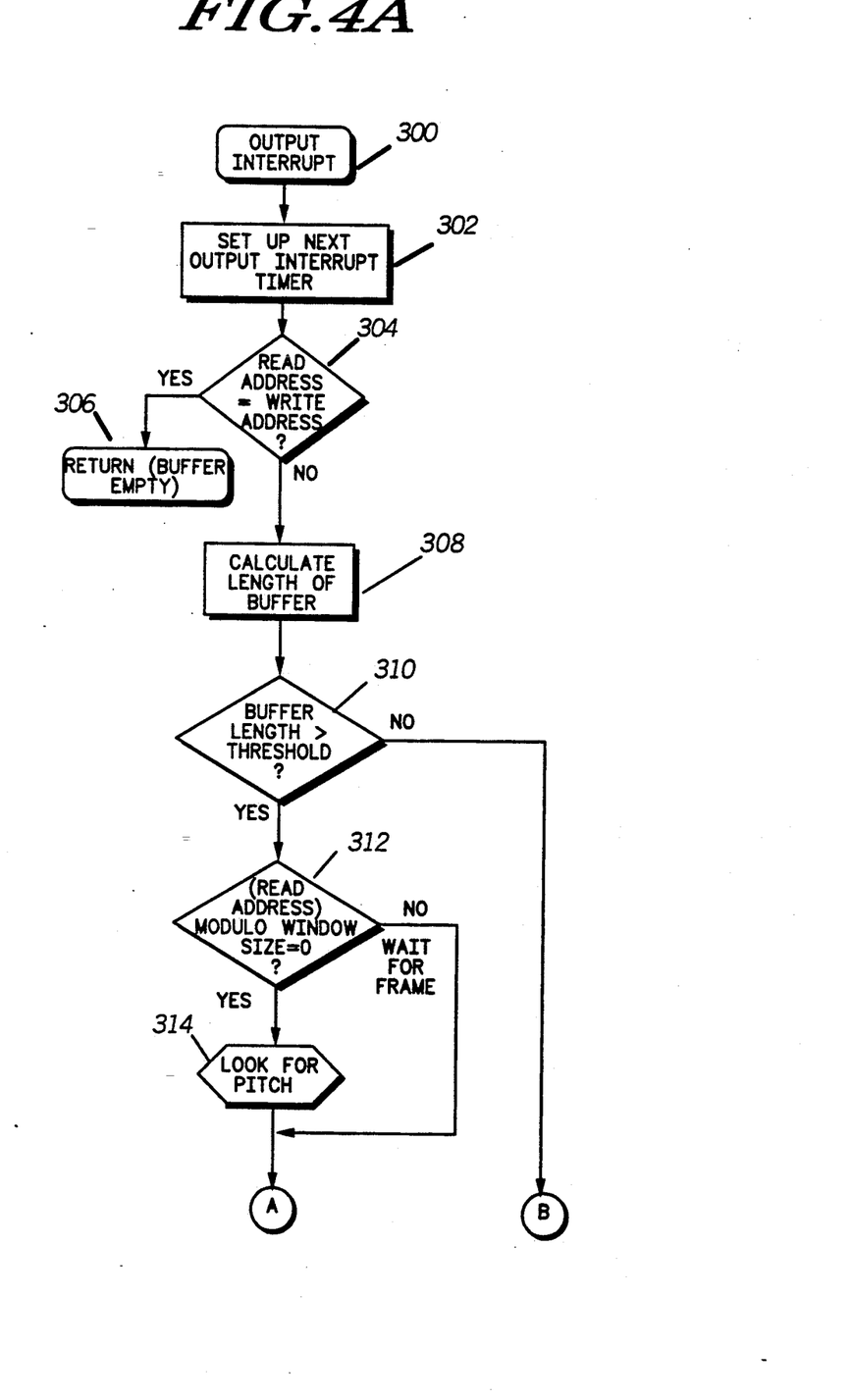
FIGS. 4A and 4B show a flow chart illustrating an output process in another embodiment of the invention.
Figure 4B:
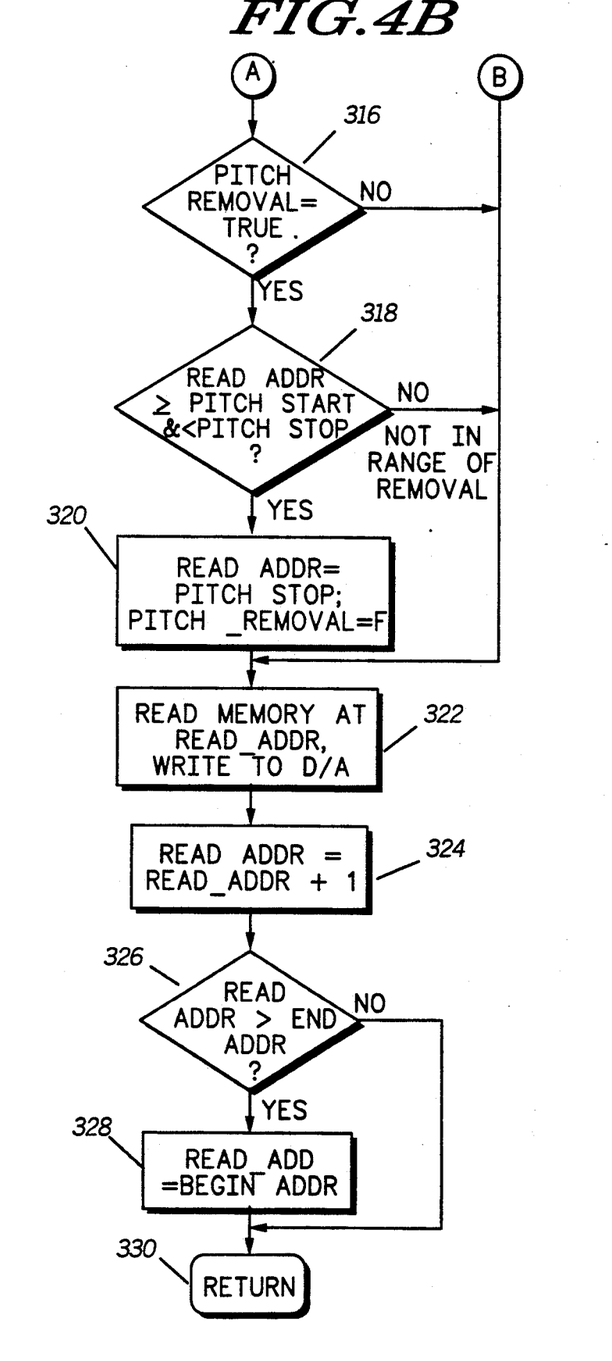

Referring to FIGS. 4A and 4B there is shown a flow chart illustrating an output process in another embodiment of the invention. According to this embodiment the buffer output delay is shortened by deleting at least a portion of the buffered speech signal that is repetitive (i.e., having a well behaved pitch characteristic), with minimal degradation in the audio quality of the output signal. The process begins when an interrupt 300 occurs for the output process of the buffer. In step 302 an output interruption timer is set up. Then in decision 302 a determination is made as to whether the read address equals the write address. If the read address is not equal to the write address, that signifies that the buffer output has some delay. Therefore in step 308, the length of the buffer is calculated when there is a delay in the output process. If the read address equals the write address, that signifies that the buffer is empty and the process returns (306) to the main instruction stream at the point where it was interrupted. In decision 310 a determination is made on whether the buffer length is greater than a predetermined threshold. If it is not, that means that the subject portion of stored speech is not suitable for removal and the process proceeds to step 322. If it is, a further decision 312 is made on whether the read address modulo window size equals zero. This occurs every multiple of the window size. If the modulo function is zero, then in step 314 the pitch period is determined (i.e., the beginning and end of a pitch period to be removed). If the modulo function is not zero, the process proceeds to decision 316. In decision 316 it is determined whether the pitch period is suitable for removal (i.e., a "True" condition). If a True condition exists in step 316, a further decision (318) is made. If a True condition does not exist, then the process goes to step 322. In decision 318 it is determined whether the read address is greater than or equal to the pitch period start and less than the pitch period stop. If it is not, that indicates that the read address is not in the range of the part of the stored signal to be removed, and the process goes to step 322. If on the other hand, the read address is greater than or equal to the pitch start and less than the pitch stop, that means that a portion of the stored speech has been identified for removal and the process goes to step 320. In step 320 a read address pointer is set at the pitch period stop address (i.e., the pointer skips over the parts of the stored speech not marked for removal). In step 322 the memory at the read address is read and written to the D/A converter at the output of the buffer (i.e., the output process continues). The process pointer is then incremented to the next location, in step 324. A decision 326 is made as to whether the current read address is greater than the end address (i.e., whether or not the physical end of memory has been reached). If it is, the current read address is set to be equal to the begin address (step 328) and in step 330 the process returns to the main instruction stream at the point where it was interrupted. If the current read address is not greater than the end address, step 328 is skipped. Steps 326 and 328 form the circular buffer.

What is claimed is:

1. In an electronic system comprising a buffer having an input for receiving an input signal and an output for providing an output signal representing the input signal after a delay corresponding to a buffer length of the buffer, and a buffer controller coupled to the buffer, a method for substantially eliminating any delays in providing the output signal, comprising the steps of:

with the buffer:
 (a) storing the input signal in the buffer at an input rate;
 (b) producing the output signal at an output rate;
with the buffer controller:
 (c) determining whether the current buffer length is greater than a predetermined threshold;
 (d) analyzing at least a portion of the input signal stored in the buffer to determine which parts of the input signal can be removed from the input signal without significant loss of quality, when the current buffer length is greater than a predetermined threshold; and
 (e) deleting at least some of the parts of the input signal stored in the buffer that can be removed from the input signal without significant loss of quality, thus decreasing the length of the delay in providing the output signal.

2. The method of claim 1, wherein step (e) further comprises deleting at least some parts of the input signal stored having an energy magnitude which is less than a predetermined energy level.

3. The method of claim 1, wherein step (e) further comprises determining whether the parts to be deleted correspond to a pitch period in the speech represented by the input signal, and the method further comprises the buffer controller steps of:

(c 1) comparing a portion of the input signal stored in the buffer to plurality of portions of the input signal previously stored in the buffer and determining the pitch period based on the comparison; and (c 2) deleting at least part of the pitch period determined in step (c 1), when the current buffer length is greater than a predetermined threshold.

4. The method of claim 1, further comprising the step of:

(f) filtering the output signal to remove undesired components produced by deleting the parts of the input signal stored in the buffer.

5. The method of claim 1, further comprising the step of:

(f) causing the output rate to be greater than the input rate.

6. The method of claim 5 wherein the output rate is at most ten percent greater than the input rate.

7. The method of claim 3, further comprising the step of:

(f) causing the output rate to be greater than the input rate, when the portions of the input signal in the buffer representing a pitch period are less than a threshold number.

8. The method of claim 3 wherein step (c 1) comprises performing a correlation function.

9. The method of claim 3, further comprising the step of:

(f) causing the output rate to be greater than the input rate, when it is determined that there are not any parts of the input signal that can be removed without significant loss of quality.

10. An electronic system comprising:

a buffer for storing an input signal, at an input rate, and for producing an output signal representing the input signal, after a delay corresponding to a buffer length, the output signal being produced at an output rate;

a buffer controller coupled to the buffer, the buffer controller comprising:

means for determining whether the current buffer length is greater than a predetermined threshold;

means for analyzing at least a portion of the input signal stored in the buffer to determine which parts of the input signal have a magnitude lesser than a predetermined energy level, when the current buffer length is greater than a predetermined threshold; and means for deleting at least some of the parts of the input signal stored in the buffer having a magnitude lesser than the predetermined energy level, thus decreasing the length of the delay in providing the output signal.

11. The electronic system of claim 10, further comprising:

a receiver, coupled to the input of the buffer, and having an input for receiving an information signal representing speech, and for providing the input signal representing the information signal to the buffer.

12. The electronic system of claim 10, further comprising:

a transmitter, coupled to the output of the buffer, and having an input for receiving the output signal and an output for transmitting the output signal.

13. The electronic system of claim 11, further comprising:

an audio section for presenting audio signals, representing the output signal, to a listener.

14. The electronic system of claim 11, further comprising:

a analog-to-digital converter, disposed between the receiver and the buffer.

15. The electronic system of claim 11, further comprising:

a digital-to-analog converter, disposed between the buffer and the audio section.

16. The electronic system of claim 11, further comprising:

a filter for filtering the information signal to remove undesired components produced by deleting parts of the information signal representing speech.

17. The electronic system of claim 11 wherein the buffer controller comprises:

means for sampling parts of the stored signal contiguous to the parts deleted; and means for eliminating discontinuities in the signal stored in the buffer formed by removal of the parts deleted.

18. An electronic device comprising:

a buffer for storing an input signal, at an input rate, and for producing an output signal representing the input signal, after a delay corresponding to a buffer length, the output signal being produced at an output rate;

a buffer controller coupled to the buffer, the buffer controller comprising:

means for determining whether the current buffer length is greater than a predetermined threshold;

comparison means for comparing a portion of the input signal stored in the buffer to plurality of portions of the input signal previously stored in the buffer and determining a pitch period based on the comparison;

analyzer means for analyzing the pitch period determined by the comparison means, when the buffer controller determines that the current buffer length is greater than the predetermined threshold; and means for deleting at least some of the pitch periods of the signal to produce the output signal, thus decreasing the length of the delay in providing the output signal.

19. The electronic system of claim 18, further comprising:

a receiver, coupled to the input of the buffer, and having an input for receiving an information signal representing speech, and for providing the input signal representing the information signal to the buffer.

20. The electronic system of claim 18, further comprising:

a transmitter, coupled to the output of the buffer, and having an input for receiving the output signal and an output for transmitting the output signal.

21. The electronic system of claim 18, further comprising:

an audio section for presenting audio signals, representing the output signal, to a listener.

22. The electronic system of claim 18, further comprising:

an analog-to-digital converter, disposed between the receiver and the buffer.

23. The electronic system of claim 18, further comprising:

a digital-to-analog converter, disposed between the buffer and the audio section.

24. The electronic system of claim 18, further comprising:
a filter for filtering the information signal to remove undesired components produced by deleting parts of the information signal representing speech.

25. The electronic system of claim 18 wherein the buffer controller comprises:
means for sampling parts of the stored signal contiguous to the parts deleted; and
means for eliminating discontinuities in the signal stored in the buffer formed by removal of the parts deleted.

* * * * *